US012306586B2

(12) United States Patent
Allimann et al.

(10) Patent No.: US 12,306,586 B2
(45) Date of Patent: May 20, 2025

(54) DEVICE FOR FASTENING A BACK ON A MIDDLE FOR A TIMEPIECE

(71) Applicant: The Swatch Group Research and Development Ltd, Marin (CH)

(72) Inventors: Joël Allimann, Vallon (CH); Benjamin Chartrel, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 317 days.

(21) Appl. No.: 17/952,689

(22) Filed: Sep. 26, 2022

(65) Prior Publication Data

US 2023/0176525 A1 Jun. 8, 2023

(30) Foreign Application Priority Data

Dec. 7, 2021 (EP) .................................... 21212693

(51) Int. Cl.
*G04B 37/00* (2006.01)

(52) U.S. Cl.
CPC ................................ *G04B 37/0008* (2013.01)

(58) Field of Classification Search
CPC ........... G04B 37/0008; G04B 37/0033; G04B 37/08; G04B 37/11; G04B 37/0041
See application file for complete search history.

(56) References Cited

U.S. PATENT DOCUMENTS 6,761,479 B2 * 7/2004 Meyrat .............. G04B 37/0008 368/310
10,088,806 B2 * 10/2018 Vuille .................. G04B 19/286

FOREIGN PATENT DOCUMENTS

EP 2 874 022 A1 5/2015
EP 3 062 171 A1 8/2016
EP 3 680 729 A1 7/2020
EP 3 796 104 A1 3/2021

OTHER PUBLICATIONS

European Search Report of EP 21 21 2693 dated May 6, 2022.

* cited by examiner

*Primary Examiner* — Edwin A. Leon
(74) *Attorney, Agent, or Firm* — Sughrue Mion, PLLC

(57) ABSTRACT

A device for fastening a back on a middle of a watch, the back having a shoulder forming a cover arranged to cover totally or partially with the middle and a body arranged to rest in the middle, the device including at least one pin integral with the middle and a gasket mounted between the back and the middle. The back includes, close to its periphery, at least one recess, the pin being arranged to slide in the recess between a first position, referred to as insertion position wherein the back is free, and a second position referred to as locking position wherein the back is locked and angularly positioned in relation to the middle. The recess includes at least one bump to form a hard spot and increase the torque during the passage of the pin at the bump.

17 Claims, 3 Drawing Sheets

DEVICE FOR FASTENING A BACK ON A MIDDLE FOR A TIMEPIECE

CROSS REFERENCE TO RELATED APPLICATIONS

This application claims priority to European Patent Application No. 21212693.2, filed on Dec. 7, 2021, the entire contents of which are incorporated herein by reference.

FIELD OF THE INVENTION

The invention relates to a device for fastening a back on a middle of a watch.

The invention also relates to a timepiece, particularly a watch, including such a device.

BACKGROUND OF THE INVENTION

The external parts of watches and similar apparatuses are subject to many constraints, in particular water-resistance, robustness, appearance, and must be produced so as to prevent any unintentional dismantling irremediably resulting in an after-sales intervention for exchanging gaskets, cleaning, lubricating, or even repairing.

Some external part or control components must, also, be angularly indexed in relation to one another, for original reference, rest, or actuation position locations, or also for facilitating the reading of indications or of graduations, or for ensuring the continuity of skew surfaces and/or decorations. This angular indexing is often delicate to perform well, in combination with a good tightening of the components and with a perfect water-resistance of the gaskets.

SUMMARY OF THE INVENTION

The invention proposes to produce a water-resistant and secured assembly of external part components with an angular indexing that is easy to perform.

To this end, the invention relates to a device for fastening a back on a middle of a watch, the back having a shoulder forming a cover arranged to cover totally or partially with the middle and a body arranged to rest in the middle, said device comprising a ring mounted between the back and the middle and integral with the latter, and at least one pin integral with the back and arranged to cooperate with the ring and the middle, According to the invention, said ring comprises at least one recess arranged to cooperate with the pin, said pin being capable of sliding in the recess between a first position, referred to as insertion position wherein the back is free, and a second position referred to as locking position wherein the back is locked and angularly positioned in relation to the middle, and wherein said recess comprises at least one bump to form a hard spot and increase the torque during the passage of the pin at the bump.

In accordance with other advantageous variants of the invention:

- the pin is mounted on the back, said pin having a body, a head and a foot, the body and the foot having a diameter smaller than the diameter of the head;
- the middle comprises a shoulder for receiving the ring, said shoulder having at least one hole in such a way as to secure the ring to the middle via fastening means;
- the middle comprises at least one hollow arranged to cooperate with the head of the pin, the head of the pin sliding in the hollow;

- the ring is made of an elastically deformable material, such as polyoxymethylene, polyurethane, a polymer-based material, or also an elastomer material;
- the pin is made of metal or metal alloy;
- the recess extends according to a radius of the ring and is passing through in such a way that the pin slides through the recess;
- the recess, a first and a second end, and two walls, the distance between the two walls being equivalent to the diameter of the body of the pin in such a way as to guide the pin and hold it axially;
- the first end forms a space for inserting the pin, and the second end forms a stop and holds the pin in position;
- the first end has dimensions similar to the head of the pin, and the second end has dimensions similar to the body of the pin;
- the bump is formed on one of the two walls of the recess;
- the recess comprises a plurality of bumps, the distance between each bump being identical;
- the recess comprises a plurality of bumps, the distance between each bump being decreasing;
- the device comprises at least three pins angularly distributed on the back and disposed at regular intervals.

The invention also relates to a timepiece including such a fastening device.

BRIEF DESCRIPTION OF THE DRAWINGS

Other features and advantages of the invention will become more apparent upon reading the following description of a particular embodiment of the invention, given by way of simple illustrative and non-limiting example, and the appended figures, wherein.

DETAILED DESCRIPTION OF PREFERRED EMBODIMENTS

Figure 1:
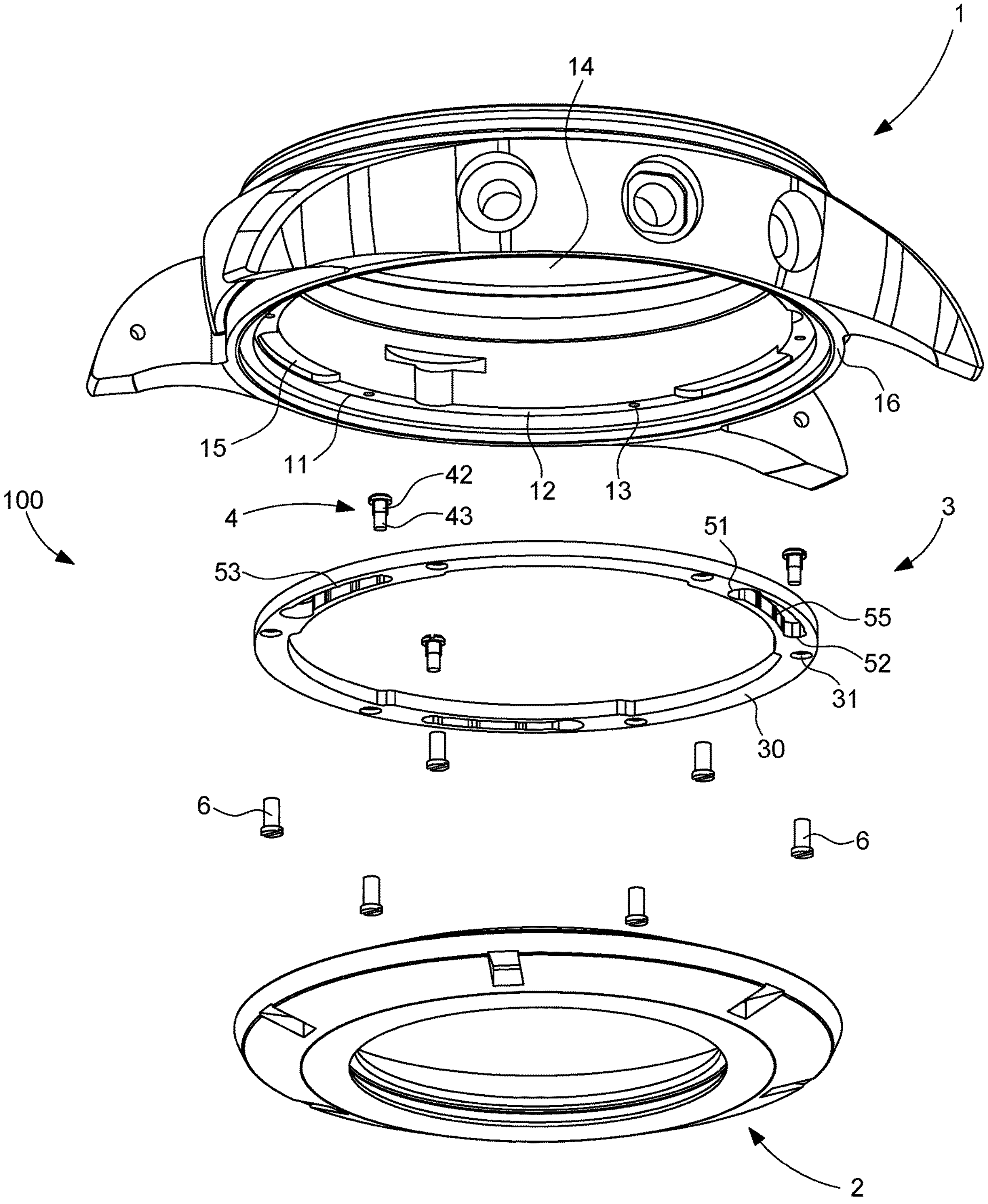
FIG. 1 is a perspective exploded view of a fastening device in accordance with the invention.

The invention proposes to produce a water-resistant and secured assembly of external part components with an angular indexing that is easy to perform, and in a guaranteed position, and this with a minimal number of components.

FIGS. 1 to 3*c* illustrate the non-limiting example of the mounting and of the angular indexing of a back in relation to a watch middle.

The invention relates to a device for fastening 100 a back 2 on a middle 1 of a watch comprising a ring 3 mounted in the middle, at least one pin 4 integral with the back and arranged to cooperate with the ring 3, and a gasket mounted on the back 2. The reverse mounting is obviously possible, and the pin 4 may be mounted on the middle 1 whereas the ring 3 is mounted on the back 2 that may be solid or transparent.

Figure 2A:
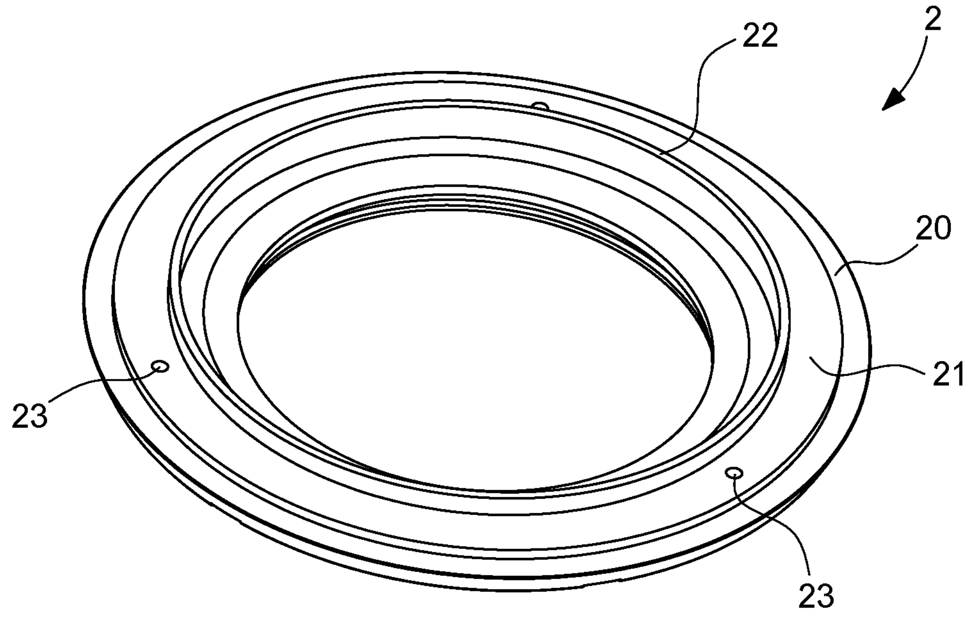
FIGS. 2*a* and 2*b* are respectively a perspective view of a back and of a middle of a fastening device in accordance with the invention.
Figure 2B:
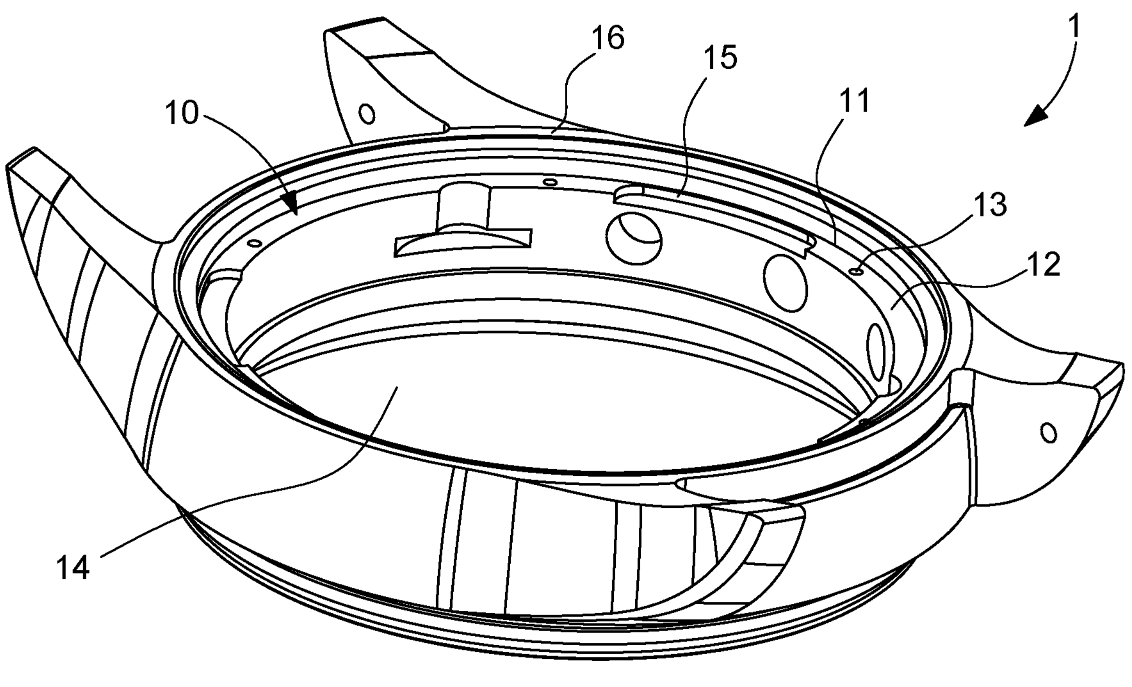

The back 2 is arranged to change from a first dismantled insertion position, to a second assembled and locked position. As illustrated in FIG. 2*a*, the back 2 has a shoulder 21, slightly raised in relation to the cover and forming a groove 20 at the periphery of the back. The back 2 is arranged to cover totally or partially the middle 1 and comprises a body 22 arranged to rest in the empty space 14 of the middle 1.

According to the invention, this fastening device includes at least one pin 4, which is arranged to be axially inserted between the back 2 and the middle 1, rotatably fastened in relation to one of them, and that slides in a recess 5 of the ring 3.

This pin 4 comprises a head 40 equipped with a slot 41, a body 42 and a foot 43, the pin 4 being screwed in the back 2 in such a way as to render it integral with the latter. As illustrated, the body 42, the head 40 and the foot 43 are cylindrical, the head 40 having a diameter larger than the diameters of the body 42 and of the foot 43. The pin 4 is screwed on the back 2, the back 2 comprising to this end at least one threaded hole for receiving the foot 43 of the pin 4. The pin 4 is preferably made of a metal or of a metal alloy material such as steel. Of course, shapes other than a slot could be used to fasten the pin, such as a star or a cross for example.

Figure 3A:
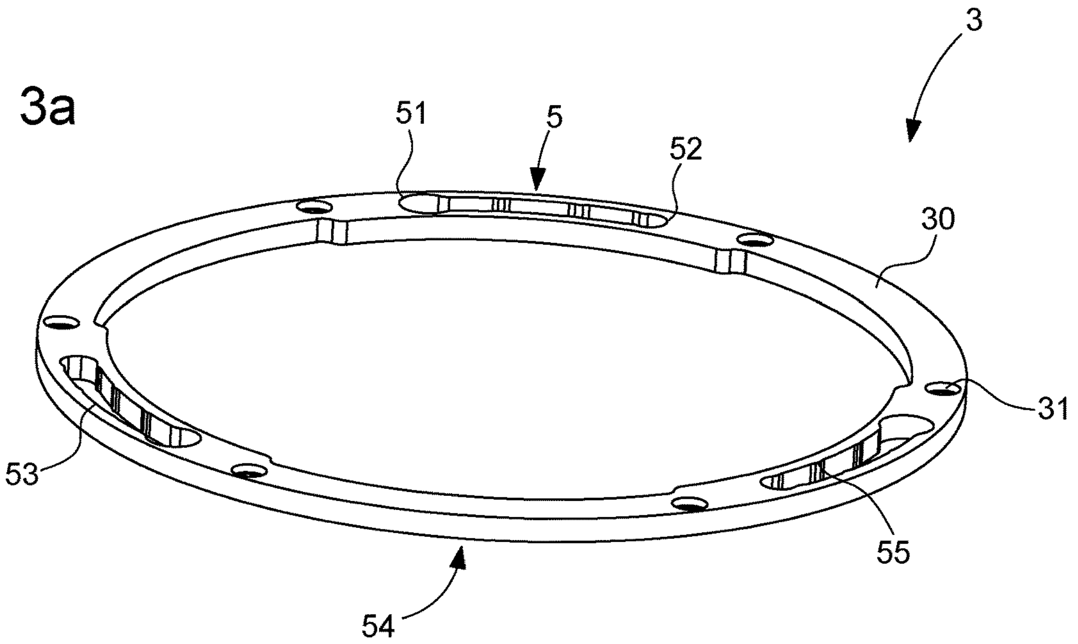
FIGS. 3*a* to 3*b* are respectively a perspective view of a ring and of a pin of a fastening device in accordance with the invention
Figure 3B:
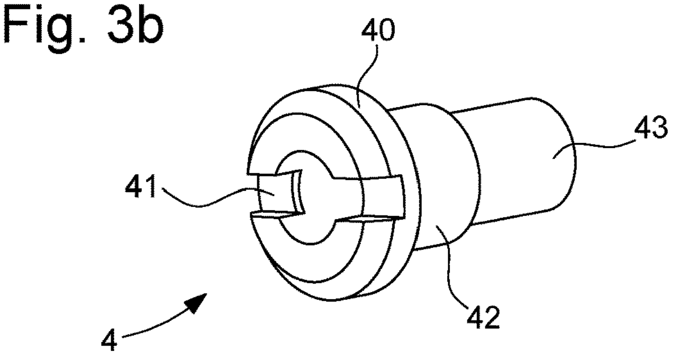
Figure 3C:
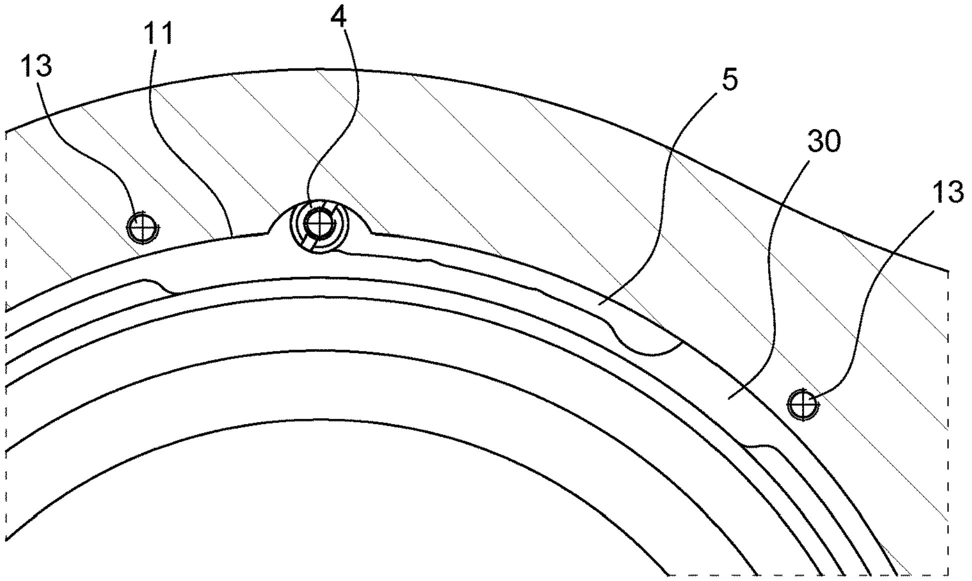
FIG. 3*c* illustrates a sectional view of a fastening device in accordance with the invention.

As can be observed in FIG. 3*a*, the ring 3 is formed by a bow 30 and comprises at least one recess 5 arranged to cooperate with the pin 4, the pin 4 being arranged to slide in the recess 5 between a first position, referred to as insertion position wherein the back 2 is free, and a second position referred to as locking position wherein the back 2 is locked and angularly positioned in relation to the middle 1, the recess 5 comprising at least one bump 55 to form a hard spot and increase the torque during the passage of the pin 4 at the bump 55. Such an arrangement also ensures a security against the loosening and consequently the loss of water-resistance.

In such a way as to make the ring portion receiving the recess 5 more rigid, this portion has a larger width than the rest of the ring in such a way that the ring 5 is compressed between the back 2 and the middle 1 at this wider portion.

The ring 3 may be made of a material selected from: polyoxymethylene, polyurethane, a polymer-based material, or also elastomer, it is known for example asutane® or hytrel®. The material selected, the interference geometry with the pin as well as the material of the pin make it possible to determine the maximum tightening torque. The interest of such a ring 3, preferably in a polymer elastic material or similar, is its ease to manufacture it and to replace it in the event of breakage or wear.

The ring 3 is fastened to the middle 1 via screws 6 passing through the ring 3 via holes 31 and being screwed in holes 13 of the middle 1. Advantageously, the heads of the screws 6 rest in a spot facing formed at the holes 31 and at the surface of the ring 3. The ring 3 rests against the back 12 and the wall 11 of a shoulder 10 of the middle 1, the shoulder having dimensions similar to the ring in such a way that the surface of the ring 3 is flush with the edges of the middle 1. Advantageously, the back 12 of the shoulder 10 has at least one hollow 15 extending according to a radius of the middle, the position of the hollow 15 corresponding to the position of the recess 5 of the ring once the latter has been mounted. The width of the hollow is provided greater than the width of the recess 5, the width of the recess is equivalent to the dimensions of the body 42 of the pin 4 and the width of the hollow 15 is as a minimum equivalent to the width of the head 40 of the pin 4 in such a way that the pin 4 can move in the hollow 15 and to hold it axially in the recess 5. It should be noted that the length of the hollow 15 defines the length of travel of the pin 4.

In the first insertion dismantled position, the middle 1 and the back 2 have in relation to one another a first angular orientation.

According to the invention, the back 2 comprises radial water-resistance means, such as an O-ring gasket (not shown in the figures), at the interface between the middle 1 and the back 2, the gasket resting in the groove 20 of the cover and thus filling the space formed by the shoulder 21 at the periphery of the back. The passage from the first insertion dismantled position to the second assembled and locked position is performed under the action of loads exerted by an operator: an axial load to overcome the resistive force of the O-ring gasket and to assemble the back 2 and the middle 1, and a torque to bring them in an angular indexing position.

In the second assembled and locked position, the middle 1 and the back 2 have in relation to one another a second angular orientation different from the first angular orientation. The back 2 and the middle 1 are held axially by means of a bayonet fitting.

Advantageously, the securing of the back 2 and of the middle 1 by bayonet fitting, particularly around an axial direction D, is reversible, and makes it possible to dismantle them. In a manner specific to the invention, this dismantling needs on the part of an operator loads similar to those exerted during the assembly, this dismantling preferably needs the use of a special tool, cooperating for example with holes or peripheral notches disposed in the visible face of the back 2. Such an assembly makes it possible to avoid a dismantling of the back by the wearer, or a dismantling following clumsiness or a shock.

The body 42 of the pin is arranged to cooperate with at least one complementary relief, such as a bump 55, that the recess 5 of the ring 3 includes. As illustrated in FIG. 3*a*, the ring 3 comprises at least one recess that extends according to a radius of the ring 3 and has a width of dimension equivalent to the diameter of the body 42 of the pin 4 in such a way that the pin 4 slides within the recess 5. The recess 5 comprises a first end 51 and a second end 52, and two walls 53.

Thus, any passage of the pin 4 on the bump 55 in the recess 5 generates a resistant torque that tends to oppose the relative rotational movement between the middle 1 and the back 2.

According to a preferred embodiment, the recess 5 comprises a plurality of bumps 55, which are arranged to oppose a successive resistance during the passage of the pin 4. According to the invention, in the same recess 5, the angular distance between the successive bumps 55 is decreasing in such a way as to oppose an increasing resistance, during a rotation between the back 2 and the middle 1. The angular distance between the successive bumps 55 may also be provided constant in such a way as to oppose a constant resistant torque.

A plurality of configurations for the arrangement of the bumps are achievable. According to a first embodiment, one or more bumps 55 are present on a single lateral wall of the recess 5. According to a second embodiment, one or more bumps 55 are disposed on the two lateral walls of the recess 5, the bumps 55 of each wall being disposed opposite one another. According to a third embodiment, one or more bumps 55 are disposed on the two lateral walls of the recess 5, the bumps 55 of each wall being offset from one another. Likewise, the distance between bumps 55 positioned opposite may vary in such a way as to provide a progressive resistant torque.

The first end 51 of the recess 5 forms a space for inserting the head 40 of the pin 4, and the second end 52 forms a stop and holds the pin 4 in position in the recess 5; For this, the first end 51 has dimensions slightly larger than that of the head 40 of the pin 4, and the second end 52 has dimensions similar (down to the last manufacturing tolerance) to the body 42 of the pin 4.

It is understood that the resistive force is all the more important as the number of recesses 5, of bumps 55, the dimensions of bumps, and of additional pins 4 in cooperation is high. It is therefore possible to play on the number of successive bumps 55, and/or on the number of pins and of recesses. According to a preferred embodiment of the invention, the ring 3 comprises three recesses 5 angularly distributed in a regular manner, and the back 2 comprises three complementary pins 4.

Naturally, the configuration may be reversed, with a ring 3 integral with the back 2 and a pin 4 integral with the middle 1.

It could be contemplated to eliminate the six fastening screws 6 and to add three extra pins 4 fastened on the middle 1. This would add three extra grooves and would also offer the resistance to the dismantling on the axis D, via this double bayonet.

It could also be contemplated to have two pins on the middle and two pins on the back to only have four grooves to produce.

During the assembly, the operator places the back 2 on the middle 1 in such a way as to make the head 40 of the pin(s) 4 correspond with the first end 51 of the recess(es) 5 in such a way that the pins 4 slot therein when the operator imparts a translational movement along the axis D at the back 2 to place the cover 20 of the back 2 close to the lower edge 16 of the middle 1, and until the pin abuts against the back of the hollow 15 and thus to ensure the water-resistance thanks to the gasket. The friction of the O-ring gasket makes it possible to offer a first resistance. The pin 4 has a height slightly greater than the distance between the back of the hollow 15 and the back 2, which makes it possible to prevent the contact between the back 2 and the middle 1, and a play of 0.02 mm to 0.04 mm is present between the back and the middle.

Subsequently, the operator imparts a progressive torque to impart the relative rotation between the middle 1 and the back 2, during this rotation, the operator performing the assembly encounters a second resistance during the cooperation of the body 42 of the pin 4 with the first bump 55 of the recess 5. Thus, the resistant torque progresses during the complete passage of the bump 55.

In a first scenario, the first bump 55 cooperating with the pin 4 is single. In a second scenario, the recess 5 comprises a plurality of bumps 55 so that the operator provides a load in jerks during the rotation, the accumulated resistant torque peak increasing during each passage of hard spot, to reach, at the indexing angle, the maximum value. The operator thus encounters a sensation of increasing resistance due to the fact of the bumps and of the “pin-bump” interference that is stronger as the case is closed by rotating the back.

As illustrated in FIG. 1 and FIG. 3*a*, the ring 3 comprises three recesses 5, distributed at 120°, each of the recesses 5 being arranged to cooperate with a pin 4 complementary to the recess 5. The back 2 thus comprises three pins 4 distributed at 120°, and the operator feels a single passage of hard spot when the three pins 4 at 120° pass a bump 55 simultaneously.

The water-resistance exists as soon as the back 2 is placed on the middle 1, and the mechanism according to the invention is arranged so that, as in the previous case of a single bump, the securing of the water-resistance of the gasket is ensured as soon as the back is inserted into the middle, and subsequently that no loosening can occur without intentional action of an operator.

In practice, very good results are obtained with at least two, and preferably three, or even four, successive bumps, so as to provide a sufficient elementary angular travel for the passage of each bump.

The invention needs, during the assembly, the successive crossing of a plurality of bumps in such a way as to form an increasing resistance, but also during the dismantling, because, from the final indexed position, particularly on the mechanical stop, any application of a sudden load translates, in the worst case scenario, into the crossing of a single bump 55, without total disassembly, with a visual offset, and above all with no loss of water-resistance or risk of pollution inside the watch. In the example illustrated, even when the operator successively crosses three thresholds, visible optically due to the offset, the water-resistance is always ensured. To have a loss of water-resistance, the operator must partially remove the back 2 in such a way that the gasket is no longer compressed.

According to one embodiment, the distance between each bump 55 is identical, and its passage opposes the same resistant torque.

In an advantageous variant, the distance between each bump is decreasing, and the operator must apply an increasing torque.

The invention is advantageous because perfectly compatible with horological dimensions, while having a capacity of a high resistive force, which may reach 1.2 Nm±0.2 Nm according to the diameters of watches.

Moreover, in the case where the timepiece is subjected to particular constraints of significant extent, the dismantling of the mechanism according to the invention requires maintenance of the application of a possible force of accidental origin during a significant angular travel, of 5 to 10° for the crossing of a single bump in the example illustrated, the security also remaining ensured if a plurality of bumps come in succession.

According to the invention, the angular indexing is guaranteed by the second end 52 that forms a travel limit stop.

The invention, thus, makes it possible to prevent any unexpected and unintentional dismantling of the back of the middle, for example under the effect of vibrations, of successive expansion cycles, by clumsy use of the wearer, or other.

Preferably, the dismantling needs a special tool not commercially available, which ensures the execution of the maintenance by the after-sales staff having the required qualifications.

The invention lends itself well to the case where the middle and the back are made of different materials, with different expansion coefficients, or also of fragile, or hard (ceramic, sapphire), materials which do not permit standard fastening modes. Let us cite from conventional configurations the assembly of a middle into or with a sapphire back, or also a case made entirely of ceramic, a metal-ceramic combination, or similar.

An important advantage of the invention is to eliminate any contact/frictions between the back and the middle and thus prevent the appearance of residues caused by rubbing and the addition of a grease to trap them as is the case in the prior art.

Another important advantage of the invention is to provide increased security at the opening thanks to the successive passage of a plurality of notches and the obligation to remove at least partially the back before any loss of water-resistance.

The invention also relates to a timepiece or watch including such a fastening device.

In sum, the invention makes it possible to obtain a fastening device the design of which is compact, it ensures maintenance of the water-resistance of the watch, that it protects against any accidental dismantling.

The invention also makes it possible to ensure the perfect orientation of a component held locked in its operating position.

The invention provides many advantages:

from a first relative angular position, between the back and the middle, where the water-resistance function is ensured, for example as soon as the compression of a seal is performed, there is, in the mechanism according to the invention, a wide range of relative angular values between the back and the middle, wherein the water-resistance remains guaranteed, for example of a plurality of degrees, which is important in comparison with for example a standard screwed back in the case of a middle-back subassembly, where an unscrewing of a few degrees only results in the loss of water-resistance and the need for cleaning and for a new gasket, whereas according to the invention it is only after the passage of the very last notch during the dismantling that the loss of water-resistance becomes possible if the rotation is continued and that the back 2 starts to be extracted from the middle 1 (which corresponds to separating the bayonet);

a closing by succession of notches that has a broadly dimensioned closing torque of the back, both sufficient and acceptable for such a mounting, thanks in particular to the multiplication of the number of bumps distributed in the recess, with, for the operator, a sensation of screwing by steps to increase the closing torque up to the desired position, known to be the closed position, which is also fairly perceptible;

an opening security, which is increased by two factors: the need for the operator to provide a significant positive energy to pass one notch, and the successive passage of a plurality of notches prior to any loss of water-resistance.

The invention claimed is:

1. A fastening device for fastening (100) a back on a middle of a watch, the back (2) having a shoulder (20) forming a cover (21) arranged to cover totally or partially the middle (1) and a body (22) arranged to rest in the middle (1), said device comprising a ring (3) mounted between the back (2) and the middle (1) and integral with the middle, and at least one pin (4) integral with the back and arranged to cooperate with the ring and the middle, wherein said ring (3) comprises, at least one recess (5) arranged to cooperate with the pin (4), said pin (4) being capable of sliding in the recess (5) between a first position, the first position being an insertion position wherein the back (2) is free, and a second position, as the second position being a locking position wherein the back (2) is locked and angularly positioned in relation to the middle (1), and wherein said recess (5) comprises at least one bump (55) to form a hard spot and increase torque during passage of the pin (4) at the bump (55).

2. The fastening device according to claim 1, wherein the pin (4) is mounted on the back (2), said pin (4) having a body (42), a head (41) and a foot (43), the body and the foot having a diameter smaller than the diameter of the head.

3. The fastening device according to claim 1, wherein the middle (1) comprises a shoulder (10) for receiving the ring (3), said shoulder (10) having at least one hole (13) in such a way as to secure the ring to the middle via fastening means.

4. The fastening device according to claim 2, wherein the middle (1) comprises at least one hollow (15) arranged to cooperate with the head (41) of the pin, the head (41) of the pin (4) sliding in the hollow (15).

5. The fastening device according to claim 1, wherein the ring (3) is made of an elastically deformable material, including polyoxymethylene, polyurethane, a polymer-based material, or also an elastomer material.

6. The fastening device according to claim 1, wherein the pin (4) is made of metal or metal alloy.

7. The fastening device according to claim 1, wherein the recess (5) extends according to a radius of the ring (3) and is passing through in such a way that the pin (4) slides through the recess (5).

8. The fastening device (100) according to claim 1, wherein the recess (5) comprises a first and a second end (51, 52), and two walls (53), the distance between the two walls (53) being equivalent to the diameter of the body (42) of the pin in such a way as to guide the pin and hold it axially.

9. The fastening device (100) according to claim 8, wherein the first end (51) forms a space for inserting the pin (4), and the second end (52) forms a stop and holds the pin in position.

10. The fastening device (100) according to claim 8, wherein the first end (51) has dimensions similar to the head of the pin (4), and the second end (52) has dimensions similar to the body (40) of the pin.

11. The fastening device (100) according to claim 8, wherein the bump (55) is formed on one of the two walls (53) of the recess (5).

12. The fastening device (100) according to claim 1, wherein the recess (5) comprises a plurality of bumps (55), the distance between each bump (55) being identical.

13. The fastening device (100) according to claim 1, wherein the recess (5) comprises a plurality of bumps (55), the distance between each bump (55) being decreasing.

14. The fastening device (100) according to claim 1, wherein the device comprises at least three pins (4) angularly distributed on the back and disposed at regular intervals.

15. A timepiece comprising the fastening device (100) according to claim 1.

16. The fastening device (100) according to claim 1, wherein the ring (3) is integral to the middle (1) via at least one screw (6).

17. The fastening device (100) according to claim 1, wherein the ring (3) is separable from the middle (1).

* * * * *